United States Patent
Zhang et al.

(10) Patent No.: US 11,494,185 B2
(45) Date of Patent: Nov. 8, 2022

(54) METHOD, DEVICE AND COMPUTER PROGRAM PRODUCT FOR THREAD MANAGEMENT

(71) Applicant: EMC IP Holding Company LLC, Hopkinton, MA (US)

(72) Inventors: Ming Zhang, Beijing (CN); Huan Chen, Beijing (CN); Shuo Lv, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 74 days.

(21) Appl. No.: 17/207,806

(22) Filed: Mar. 22, 2021

(65) Prior Publication Data

US 2022/0214876 A1 Jul. 7, 2022

(30) Foreign Application Priority Data

Jan. 6, 2021 (CN) .......................... 202110014400.8

(51) Int. Cl.
  *G06F 9/46* (2006.01)
  *G06F 9/30* (2018.01)
  *G06F 9/52* (2006.01)
  *G06F 9/448* (2018.01)

(52) U.S. Cl.
  CPC .......... *G06F 9/3009* (2013.01); *G06F 9/4486* (2018.02); *G06F 9/524* (2013.01)

(58) Field of Classification Search
  CPC ....... G06F 9/3009; G06F 9/4486; G06F 9/524
  See application file for complete search history.

(56) References Cited

U.S. PATENT DOCUMENTS

| | | |
|---|---|---|
| 8,719,432 B1 | 5/2014 | Vermeulen et al. |
| 8,930,333 B1 | 1/2015 | Prince et al. |
| 9,525,735 B2 | 12/2016 | Das |
| 10,616,326 B2 | 4/2020 | Xu et al. |
| 2014/0136502 A1 | 5/2014 | Mohamed et al. |
| 2021/0117235 A1 | 4/2021 | Kronrod et al. |

*Primary Examiner* — Gregory A Kessler
(74) *Attorney, Agent, or Firm* — BainwoodHuang

(57) ABSTRACT

Techniques for managing threads involve acquiring respective runtime addresses and call information of a plurality of lock objects in a plurality of threads, and determining, from the plurality of lock objects, a first group of lock objects associated with first call information and a second group of lock objects associated with second call information different from the first call information. The techniques further involve providing an indication that a deadlock exists in the plurality of threads if it is determined that a first group of runtime addresses of the first group of lock objects overlaps with a second group of runtime addresses of the second group of lock objects. Accordingly, potential deadlocks in a plurality of threads can be analyzed, thereby avoiding the inability of the threads to proceed normally due to the deadlocks.

15 Claims, 7 Drawing Sheets

```
(gdb) disassemble test::test
Dump of assembler code for function test::test():
   0x00007fde89bf2d42 <+0>:     push   %rbp
   0x00007fde89bf2d43 <+1>:     mov    %rsp,%rbp
   0x00007fde89bf2d46 <+4>:     push   %rbx
   0x00007fde89bf2d47 <+5>:     sub    $0x18,%rsp
   0x00007fde89bf2d4b <+9>:     mov    %rdi,-0x18(%rbp)
   0x00007fde89bf2d4f <+13>:    mov    -0x18(%rbp),%rax
   0x00007fde89bf2d53 <+17>:    mov    %rax,%rdi
   0x00007fde89bf2d56 <+20>:    callq  0x7fde88e1b482 <RWlockRT::RWlockRT()>
   0x00007fde89bf2d5b <+25>:    mov    -0x18(%rbp),%rax
   0x00007fde89bf2d5f <+29>:    add    $0x118,%rax
   0x00007fde89bf2d65 <+35>:    mov    %rax,%rdi
   0x00007fde89bf2d68 <+38>:    callq  0x7fde88e1b482 <RWlockRT::RWlockRT()>
   0x00007fde89bf2d6d <+43>:    jmp    0x7fde89bf2d89 <test::test()+71>
   0x00007fde89bf2d6f <+45>:    mov    %rax,%rbx
   0x00007fde89bf2d72 <+48>:    mov    -0x18(%rbp),%rax
   0x00007fde89bf2d76 <+52>:    mov    %rax,%rdi
   0x00007fde89bf2d79 <+55>:    callq  0x7fde88e1b5ee <RWlockRT::~RWlockRT()>
   0x00007fde89bf2d7e <+60>:    mov    %rbx,%rax
   0x00007fde89bf2d81 <+63>:    mov    %rax,%rdi
   0x00007fde89bf2d84 <+66>:    callq  0x7fde88d92ce0 <_Unwind_Resume@plt>
   0x00007fde89bf2d89 <+71>:    add    $0x18,%rsp
   0x00007fde89bf2d8d <+75>:    pop    %rbx
   0x00007fde89bf2d8e <+76>:    pop    %rbp
   0x00007fde89bf2d8f <+77>:    retq
```

FIG. 6

METHOD, DEVICE AND COMPUTER PROGRAM PRODUCT FOR THREAD MANAGEMENT

CROSS-REFERENCE TO RELATED APPLICATION

This application claims priority to Chinese Patent Application No. CN202110014400.8, on file at the China National Intellectual Property Administration (CNIPA), having a filing date of Jan. 6, 2021 and having "METHOD, DEVICE AND COMPUTER PROGRAM PRODUCT FOR THREAD MANAGEMENT" as a title, the contents and teachings of which are herein incorporated by reference in their entirety.

TECHNICAL FIELD

Embodiments of the present disclosure generally relate to the field of thread management, and in particular, to a method, a device, and a computer program product for managing locks in threads.

BACKGROUND

Multithreading refers to a technology that realizes concurrent execution of a plurality of threads on software or hardware. The use of multithreading improves the utilization of system resources and improves the processing capacity of a system. In multithreading, by using a lock, it can be ensured that only one thread enters the code of a critical section at a certain time point. Thus, the consistency of operating data in the critical section can be guaranteed.

However, currently in multi-threaded systems, there is a deadlock problem. A deadlock is usually a blocking phenomenon caused by a plurality of threads in the execution process due to competition for resources or due to communication with each other. In the case of deadlocks in a plurality of threads, the plurality of threads want to obtain resources of other threads, and are unwilling to release their own resources. This will cause the plurality of threads to wait. If there is no action by an external factor, none of these threads will be able to proceed.

SUMMARY OF THE INVENTION

Embodiments of the present disclosure provide a method, a device, and a computer program product for managing threads.

In a first aspect of the present disclosure, a method for managing threads is provided. The method includes acquiring respective runtime addresses and call information of a plurality of lock objects in a plurality of threads, and determining, from the plurality of lock objects, a first group of lock objects associated with first call information and a second group of lock objects associated with second call information different from the first call information. The method further includes providing an indication that a deadlock exists in the plurality of threads if it is determined that a first group of runtime addresses of the first group of lock objects overlaps with a second group of runtime addresses of the second group of lock objects.

In a second aspect of the present disclosure, an electronic device is provided. The electronic device includes at least one processing unit and at least one memory. The at least one memory is coupled to the at least one processing unit and stores instructions for execution by the at least one processing unit. The instructions, when executed by at least one processing unit, cause the electronic device to perform actions. The actions include acquiring respective runtime addresses and call information of a plurality of lock objects in a plurality of threads, and determining, from the plurality of lock objects, a first group of lock objects associated with first call information and a second group of lock objects associated with second call information different from the first call information. The actions further include providing an indication that a deadlock exists in the plurality of threads if it is determined that a first group of runtime addresses of the first group of lock objects overlaps with a second group of runtime addresses of the second group of lock objects.

In a third aspect of the present disclosure, a computer program product is provided. The computer program product is tangibly stored in a non-transitory computer storage medium and includes machine-executable instructions. The machine-executable instructions, when executed by a device, cause this device to implement any step of the method described according to the first aspect of the present disclosure.

The Summary of the Invention section is provided to introduce the selection of concepts in a simplified form, which will be further described in the Detailed Description below. The Summary of the Invention is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in further detail with reference to the accompanying drawings, and in the example embodiments of the present disclosure, the same reference numerals generally represent the same components.

FIG. 6 shows a schematic diagram of a result of disassembling a constructor function of a lock according to some embodiments of the present disclosure.

In the accompanying drawings, identical or corresponding reference numerals represent identical or corresponding parts.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. Although the preferred embodiments of the present disclosure are shown in the accompanying drawings, it should be understood that the present disclosure can be implemented in various forms and should not be limited by the embodiments set forth herein. Instead, the embodiments are provided to make the present disclosure more thorough and complete and to fully convey the scope of the present disclosure to those skilled in the art.

The term "include" and variants thereof as used herein indicate open-ended inclusion, i.e., "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different objects or the same object. Other explicit and implicit definitions may also be included below.

In a program, program fragments that run independently can be called "threads." Multithreading refers to dividing an originally linearly executed task into several subtasks for synchronous execution, and is a technology that realizes the concurrent execution of multiple threads. The use of multithreading improves the utilization of system resources and improves the processing capacity of a system. In multithreading, by using a lock, it can be ensured that only one thread enters the code of a critical section at a certain time point, thereby ensuring the consistency of operation data in the critical section.

Figure 1:
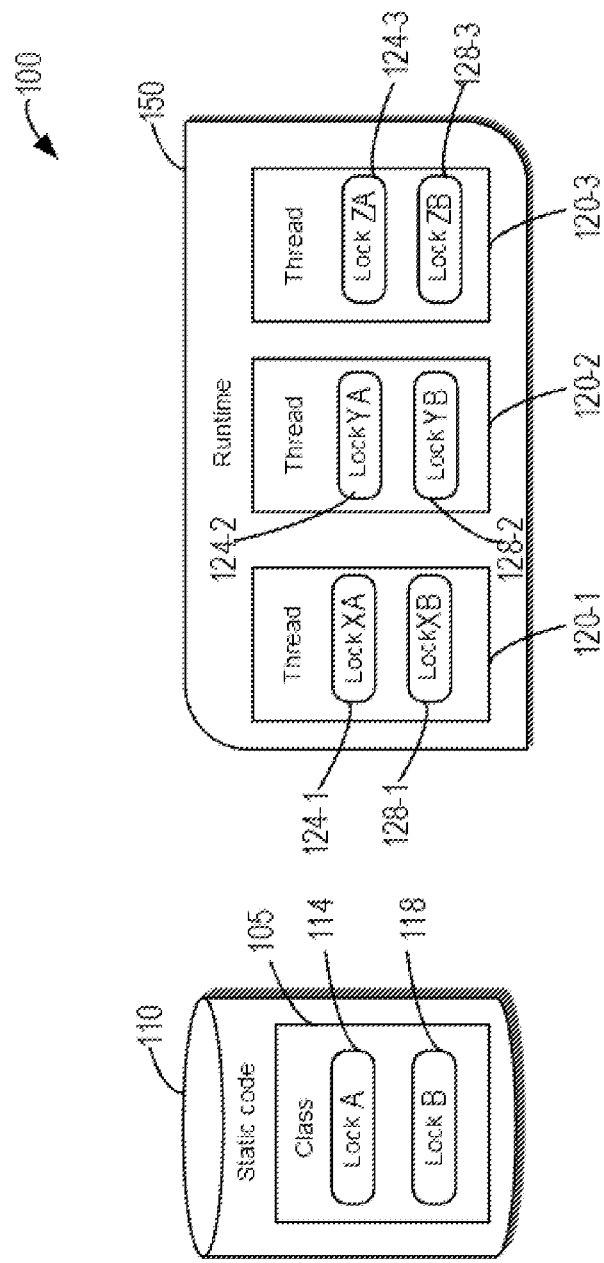
FIG. 1 shows a schematic diagram of an example system in which some embodiments of the present disclosure can be implemented.

FIG. 1 shows. System 100 is a system that can implement the multithreading technology. Static code 110 is stored in system 100, and static code 110 includes class 105. In class 105, two different locks, lock A 114 and lock B 118, are defined. The above-mentioned two different locks, lock A 114 and lock B 118, are respectively located at unique static addresses in a code segment of system 100. It should be understood that although two different locks (lock A 114 and lock B 118) in class 105 of static code 110 are shown in FIG. 1, this is only illustrative, and different classes of static code 110 of system 100 may include any number of locks.

FIG. 1 shows runtime information 150 of system 100. At runtime, system 100 may include multiple simultaneous threads, for example, thread 120-1, thread 120-2, and thread 120-3 as shown in FIG. 1 (individually referred to as thread 120 or collectively referred to as thread 120). It should be understood that although 3 simultaneous threads 120 are shown in FIG. 1, this is merely illustrative, and system 100 may include any number of simultaneous threads 120 at runtime.

Each thread 120 may include objects of lock A 114 and lock B 118. For example, as shown in FIG. 1, thread 120-1 includes object lock XA 124-1 of lock A 114 and object lock XB 128-1 of lock B 118. Thread 120-2 includes object lock YA 124-2 of lock A 114 and object lock YB 128-2 of lock B 118. Thread 120-3 includes object lock ZA 124-3 of lock A 114 and object lock ZB 128-3 of lock B 118. Different object locks of lock A 114 in different threads 120, lock XA 124-1, lock YA 124-2, and lock ZA 124-3, have different runtime addresses at runtime, and the runtime addresses of each run are not necessarily the same. Different object locks of lock B 118 in different threads 120, lock XB 128-1, lock YB 128-2, and lock ZB 128-3, have different runtime addresses at runtime, and the runtime addresses of each run are not necessarily the same.

It should be understood that example system 100 in FIG. 1 is only illustrative and not restrictive. According to the embodiments of the present disclosure, system 100 may be implemented in any suitable manner. For example, examples of system 100 may include, but are not limited to, a symmetric multi-processor, a multi-core processor, and a chip-level multi-processing or simultaneous multithreading processor.

At present, there is a deadlock problem in a multithreading system. A deadlock is usually a blocking phenomenon caused by a plurality of threads in the execution process due to competition for resources or due to communication with each other. In the case of deadlocks in a plurality of threads, the plurality of threads want to obtain resources of other threads, and are unwilling to release their own resources. This will cause the plurality of threads to wait. If there is no action by an external factor, none of these threads will be able to proceed.

Figure 2:
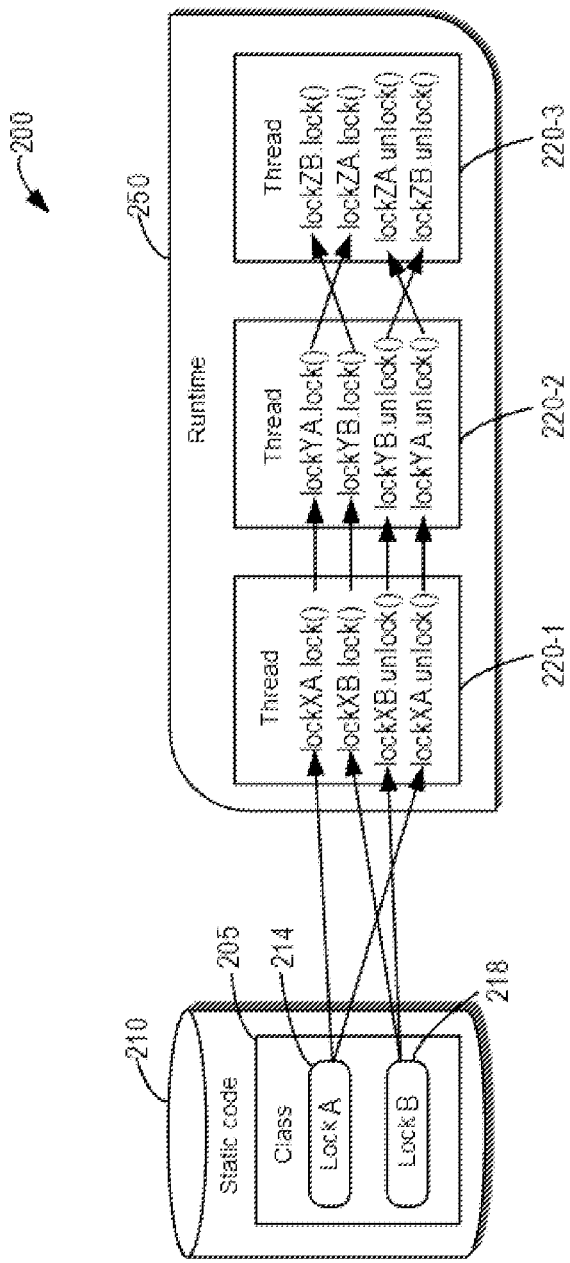
FIG. 2 shows a schematic diagram of an example of a potential deadlock in a plurality of threads.

FIG. 2 shows a schematic diagram of an example of a potential deadlock in a plurality of threads. As shown in FIG. 2, in static code 210 of example system 200, class 205 is included, which includes two different locks, lock A 214 and lock B 218. At runtime, system 200 includes 3 simultaneous different threads 220-1, 220-2, and 220-3 (individually referred to as thread 120 or collectively referred to as thread 220). Thread 220-1, thread 220-2, and thread 220-3 respectively include different objects of lock A 214: lock XA, lock YA, and lock ZA. Thread 220-1, thread 220-2, and thread 220-3 respectively include different objects of lock B 218: lock XB, lock YB, and lock ZB.

As shown in FIG. 2, in thread 220-1, lock XA is locked first, then lock XB is locked, and then lock XB and lock XA are unlocked in sequence. In thread 220-2, lock YA is first locked, then lock YB is locked, and then lock YB and lock YA are sequentially unlocked. In thread 220-3, lock ZB is locked first, then lock ZA is locked, and then lock ZA and lock ZB are unlocked in sequence. When these three different threads 220 run independently, there is no deadlock problem. However, when they are running at the same time, there may be a potential deadlock problem. For example, when lock ZA and lock XA or lock YA access the same resource, thread 220-3 first locks object lock ZB of lock B 218, and then locks object lock ZA of lock A 214. In contrast, thread 220-1 or 220-2 first locks the object of lock A 214, and then locks the object of lock B 218, so a deadlock may occur.

Regarding the problem of deadlocks described above, in conventional solutions, it is usually a programmer who checks system logs to find out a record that a deadlock occurred. In addition, after the programmer finds the deadlock record in the system logs, the programmer will look at program codes to manually look for a code that caused the deadlock, so as to find the code that caused the deadlock and correct the code. This manual method of looking for deadlocks is very inefficient, and due to the large number of codes in the system, it is usually impossible to find as many potential deadlocks as possible. In addition, because different programmers in some systems develop different codes, and each programmer may use different locks, it is difficult to find potential deadlock problems in codes developed by different programmers.

The embodiments of the present disclosure provide a solution for managing threads to solve one or more of the above problems and other potential problems. In the solution, respective runtime addresses and call information of a plurality of lock objects in a plurality of threads are acquired at runtime. Through the analysis of the runtime addresses and the call information, a first group of lock objects associated with first call information and a second group of lock objects associated with second call information different from the first call information are determined from the plurality of lock objects. In this solution, if it is determined that a first group of runtime addresses of the first group of lock objects overlaps with a second group of runtime addresses of the second group of lock objects, an indication that deadlocks exist in a plurality of threads is provided.

The embodiments of the present disclosure can analyze locks at runtime in a plurality of threads, and automatically predict potential deadlocks in static codes. In this way, it is possible to provide an indication of the existence of the deadlocks in the plurality of threads, thereby enabling the programmer to perform targeted inspection and modification of the codes of the locks with deadlocks. Through the targeted inspection and modification of the codes by the programmer, the deadlock problem in actual operation can be further avoided. In this way, operating errors caused by deadlocks can be avoided, thereby improving the overall performance of the system. In addition, the programmer does not need to check the logs, nor does the programmer need to perform aimless checks on a large number of codes, thereby reducing the programmer's work.

Figure 3:
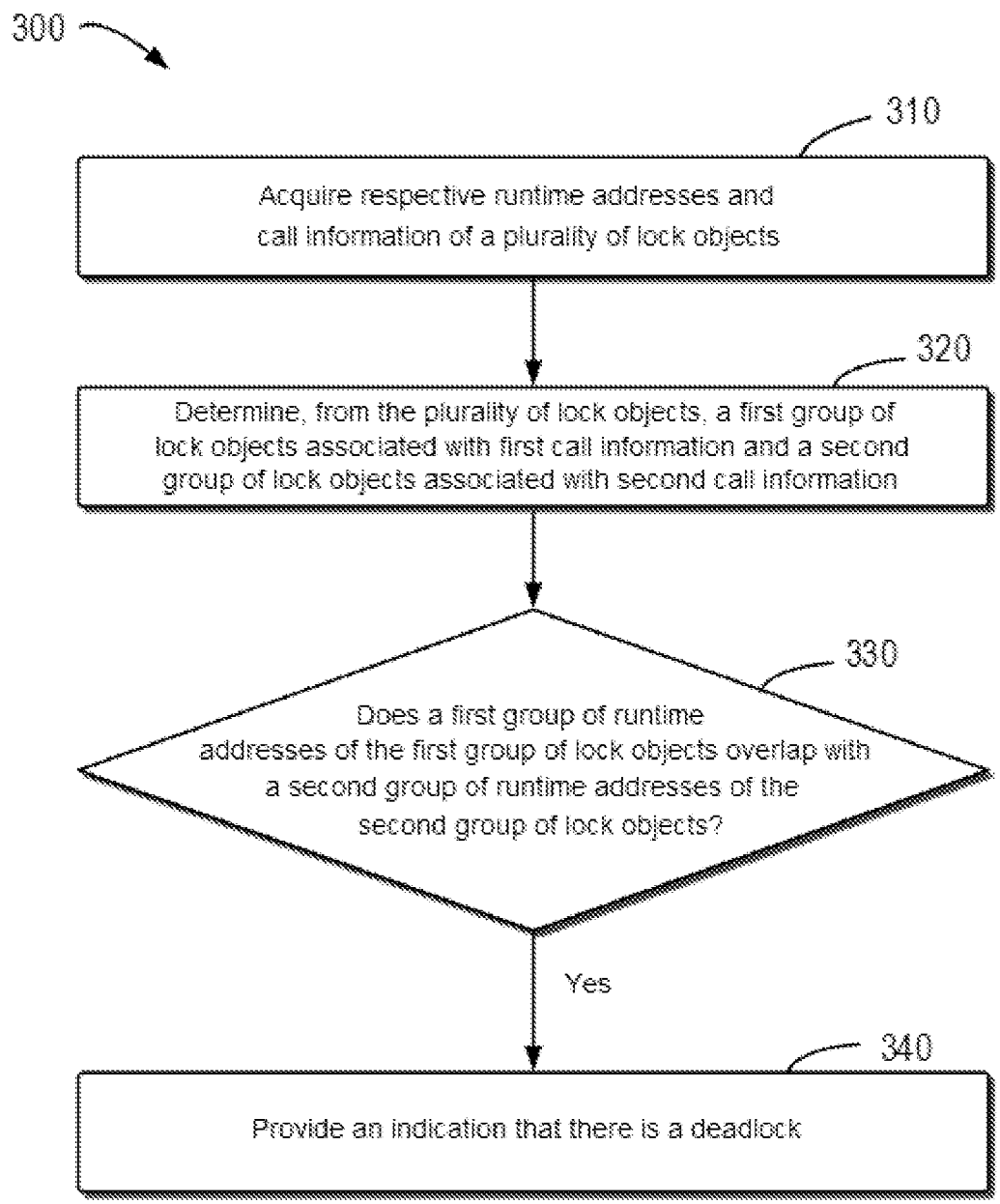
FIG. 3 shows a flowchart of an example method for managing threads according to some embodiments of the present disclosure.

The embodiments of the present disclosure will be described in detail below with reference to the accompanying drawings. FIG. 3 shows a flowchart of example method 300 for managing multiple threads according to some embodiments of the present disclosure. Method 300 may be performed by any suitable devices or apparatuses. Method 300 may include additional actions not shown and/or may omit actions shown, and the scope of the present disclosure is not limited in this regard. Method 300 is described in detail below with reference to FIG. 1.

As shown in FIG. 3, at 310, respective runtime addresses and call information of a plurality of lock objects in a plurality of threads 120 are acquired. For example, runtime addresses and call information of a plurality of objects (lock XA 124-1, lock XB 128-2, lock YA 124-2, lock YB 128-2, lock ZA 124-3 and lock ZB 128-3) of lock A 114 and lock B 118 in thread 120-1, thread 120-2, and thread 120-3 are acquired. The runtime addresses refer to respective different dynamic addresses of the plurality of objects of lock A 114 and lock B 118 when thread 120 is running. In some embodiments, the call information may indicate a call relationship between lock A 114 and lock B 118.

In some embodiments, while creating each object of lock A 114 and lock B 118, the runtime addresses of these objects and the call relationship of these objects may be saved. For example, the runtime address of lock XA 124-1 refers to the runtime address of object lock XA 124-1 of lock A 114 in thread 120-1. Lock XA 124-1 is the object of lock A 114, and the call relationship of lock XA 124-1 may refer to a jump address corresponding to the call of lock A 114. The following will describe in more detail the process of saving the corresponding runtime address and call relationship while creating each object of lock A 114 and lock B 118 in conjunction with FIG. 5.

In some embodiments, additionally, a constructor function of class 105 including lock A 114 may be disassembled, and information corresponding to lock A 114 in a result of the disassembly is a jump address (i.e., the call relationship of the objects of lock A 114) corresponding to the call of lock A 114. The call information corresponding to different locks will be described in more detail below in conjunction with FIGS. 5-6.

At 320, a first group of lock objects associated with first call information and a second group of lock objects associated with second call information are determined from a plurality of objects (lock XA 124-1, lock XB 128-2, lock YA 124-2, lock YB 128-2, lock ZA 124-3, and lock ZB 128-3) of lock A 114 and lock B 118. For example, the first call information may include call information of lock A 114, and the second call information may include call information of lock B 118. In some embodiments, lock A 114 and lock B 118 are different locks in static code 110, so the first call information is different from the second call information.

According to different call information, a plurality of objects of lock A 114 and lock B 118 are determined as the first group of lock objects (i.e., lock XA 124-1, lock YA 124-2, and lock ZA 124-3) associated with the call information of lock A 114 and the second group of lock objects (i.e., lock XB 128-2, lock YB 128-2, and lock ZB 128-3) associated with the call information of lock B 118. That is, the first group of lock objects (i.e., lock XA 124-1, lock YA 124-2, and lock ZA 124-3) corresponds to lock A 114 in static code 110, and the second group of lock objects (i.e., lock XB 128-2, lock YB 128-2, and lock ZB 128-3) corresponds to lock B 118 in static code 110. The process of determining the first group of lock objects and the second group of lock objects according to the different call information will be described in more detail below in conjunction with FIGS. 5-6.

At 330, whether the first group of runtime addresses of the first group of lock objects overlaps with the second group of runtime addresses of the second group of lock objects is determined. For example, whether overlapping addresses exist in the respective runtime addresses of the first group of lock objects (i.e., lock XA 124-1, lock YA 124-2, and lock ZA 124-3) and the respective runtime addresses of the second group of lock objects (i.e., lock XB 128-2, lock YB 128-2, and lock ZB 128-3) is determined. For example, if the runtime address of lock XA 124-1 is before the runtime address of lock XB 128-1, the runtime address of lock YA 124-2 is before the runtime address of lock YB 128-2, but the runtime address of lock ZB 124-3 is before the runtime address of lock ZA 124-1, it is indicated that there are overlapping addresses.

In some embodiments, each runtime address in the first group of runtime addresses may be compared with each runtime address in the second group of runtime addresses to find whether there is an overlap of the addresses. It should be understood that other methods may also be used to determine whether there is an address overlap.

If it is determined at 330 that there are overlapping addresses, then method 300 proceeds to 340. At 340, an indication that there is a deadlock in the plurality of threads 120 is provided. In some embodiments, an indication of a deadlock between lock A 114 and lock B 118 of a plurality of threads 120 may be provided.

Through the above method, the potential deadlock in the static code can be predicted by analyzing the runtime information, and an indication of the deadlock can be provided to the programmer. The programmer can perform targeted inspection and modification on the code to avoid the deadlock during the running of the plurality of threads. In addition, due to the analysis of the runtime address and call information at runtime, the potential deadlock is automatically predicted offline, which prevents the programmer from looking for the deadlock by checking the system logs after the deadlock occurs and searching errors in the code sentence by sentence. In this way, it can also reduce a lot of programmer's work.

Figure 4:
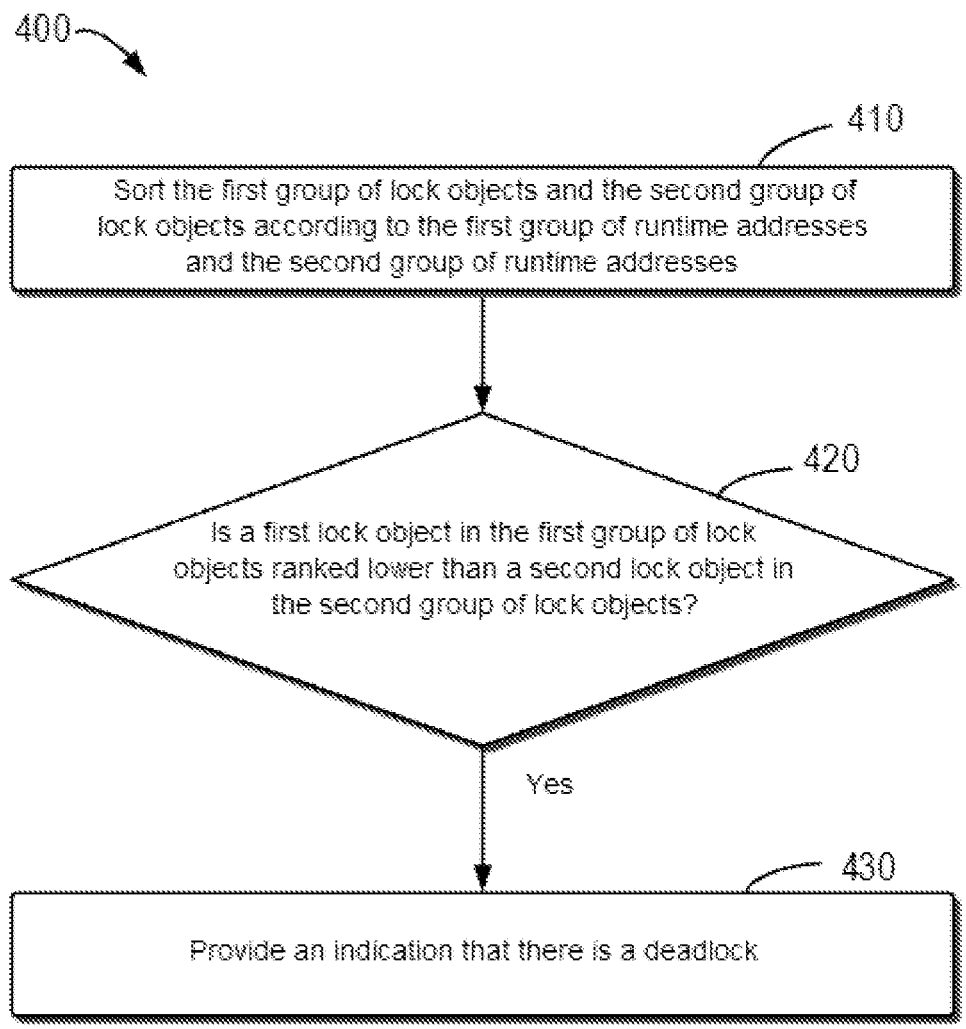
FIG. 4 shows a schematic diagram of an example method for analyzing a potential deadlock in threads according to some embodiments of the present disclosure.

In some embodiments, method 400 shown in FIG. 4 may be used to determine that there is an address overlap and provide an indication of a deadlock in a plurality of threads 120. Several embodiments for determining the deadlock in a plurality of threads 120 will be described in more detail below in conjunction with FIG. 4.

FIG. 4 shows a schematic diagram of example method 400 for analyzing potential deadlocks in threads according to some embodiments of the present disclosure. Method 400 may be regarded as an example implementation of blocks 330 and 340 in method 300.

As shown in FIG. 4, at 410, the first group of lock objects and the second group of lock objects are sorted according to the first group of runtime addresses and the second group of runtime addresses. In some embodiments, the first group of runtime addresses of the first group of lock objects (i.e., lock XA 124-1, lock YA 124-2, and lock ZA 124-3) and the second group of runtime addresses of the second group of lock objects (i.e., lock XB 128-2, lock YB 128-2, and lock ZB 128-3) may be sorted from small to large. It should be understood that in some other embodiments, the first group of runtime addresses of the first group of lock objects (i.e., lock XA 124-1, lock YA 124-2, and lock ZA 124-3) and the second group of runtime addresses of the second group of lock objects (i.e., lock XB 128-2, lock YB 128-2, and lock ZB 128-3) may be sorted from large to small. It should be understood that any suitable sorting method may be used for the sorting, for example, a bubbling method is used for the sorting.

At 420, whether first lock object in the first group of lock objects is ranked lower than a second lock object in the second group of lock objects is determined. In some embodiments, whether a first lock object in the first group of lock objects is ranked lower than a second lock object in the second group of lock objects may be determined by determining whether a maximum address in the first group of runtime addresses of the first group of lock object (i.e., lock XA 124-1, lock YA 124-2, and lock ZA 124-3) is ranked lower than a minimum address in the second group of runtime addresses of the second group of lock objects (i.e., lock XB 128-2, lock YB 128-2, and lock ZB 128-3).

In this way, it is possible to determine whether there is an overlap between the first group of runtime addresses and the second group of runtime addresses through only one comparison, without the need to compare each of the two groups of runtime addresses separately. The calculation is simpler.

In some embodiments, a first static address of lock A 114 in the code segment may be located before a second static address of lock B 118 in the code segment. In this way, the sequence of the addresses of lock A 114 and lock B 118 in the code segment is kept consistent with the sequence of the addresses of the first group of lock objects and the second group of lock objects at runtime. This makes it easy for the programmer to check for errors in the code.

Returning to FIG. 4, if it is determined at 420 that a first lock object in the first group of lock objects is ranked lower than a second lock object in the second group of lock objects, then method 400 proceeds to 430. At 430, an indication that there is a deadlock in a plurality of threads 120 is provided. In some embodiments, an indication of a deadlock between lock A 114 and lock B 118 of a plurality of threads 120 may be provided.

In some embodiments, additionally, an indication regarding the names of lock A 114 and lock B 118 may also be provided. In this way, the programmer can know the name of the lock where the deadlock will occur, so that he/she can check the errors in the code in a targeted manner, and then find the errors in the code more quickly and accurately. It should be understood that an indication including other information may also be provided. For example, information including class 105 with a deadlock may be provided, so that the programmer can locate the positions of lock A 114 and lock B 118 more quickly. In some other embodiments, the provided indications may also include other appropriate information about the deadlock.

The foregoing describes an example implementation of determining existence of an address overlap and providing the indication of a deadlock in conjunction with FIG. 4, but this is only illustrative. Other methods may also be used to determine a cause of a fault.

Through the above method, can easily find out the overlapping addresses between the runtime addresses, thereby helping to find the deadlocks. In addition, by providing the indication regarding the names of lock A 114 and lock B 118 with potential deadlocks, it can help the programmer to find and modify errors in codes in a targeted manner, thereby avoiding deadlocks at runtime, and reducing the workload of the programmer.

Figure 5:
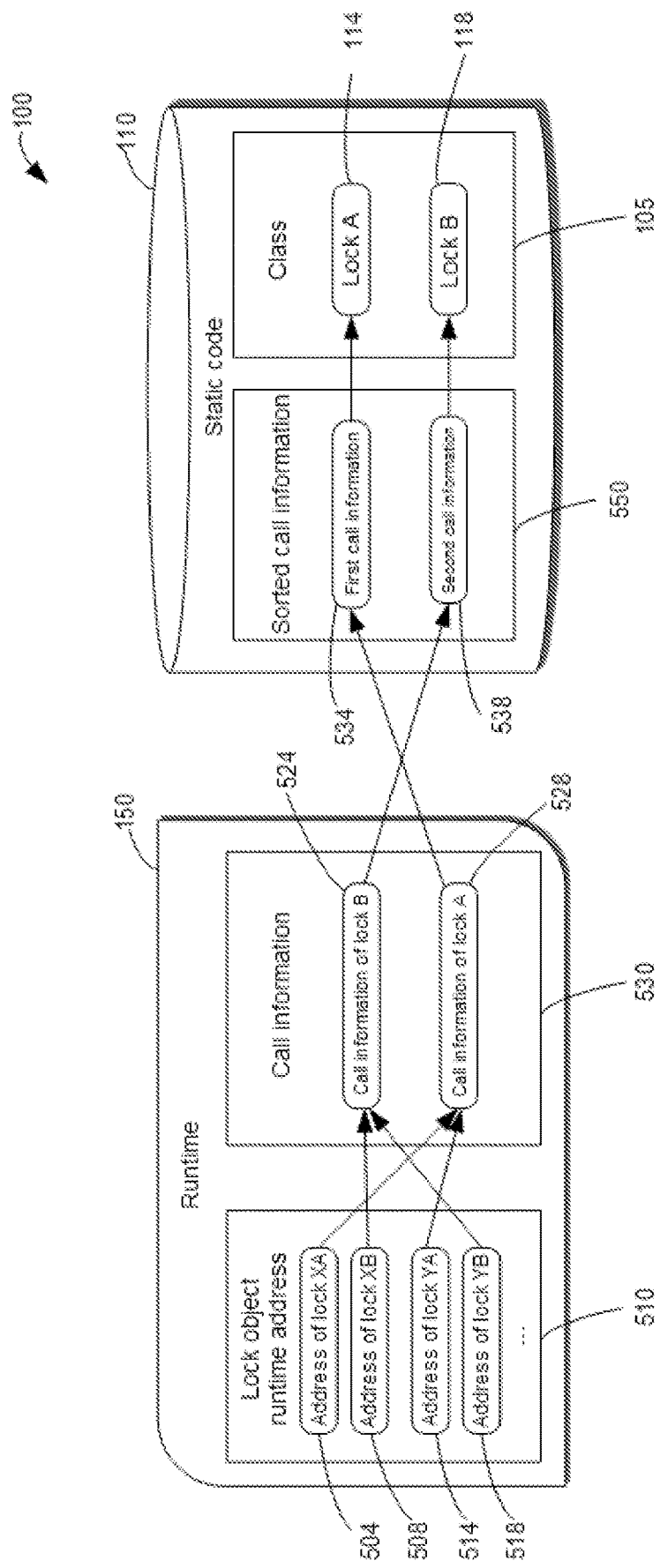
FIG. 5 shows a schematic block diagram for analyzing a potential deadlock in threads according to some embodiments of the present disclosure.

FIG. 5 shows a schematic block diagram for analyzing a potential deadlock in threads according to some embodiments of the present disclosure. In FIG. 5, runtime information 150 is shown, including runtime addresses 510 and call information 530 of the lock objects. FIG. 5 also shows static code 110, and static code 110 shows sorted call information 550 and class 105.

In some embodiments, class 105 may be class test as shown below:

```
class test {
    public:
        RWlockRT lockA;
        RWlockRT lockB;
}
```

As shown above, class 105 (i.e., the class test) includes two public members of the RWlockRT type, lock A and lock B. It should be understood that the example class test of class 105 shown above is only illustrative, and class 105 may also be a suitable class including other different numbers of different locks.

In some embodiments, a constructor function RWlockRT::RWlockRT( ) of RWlockRT may be utilized to acquire respective runtime addresses and call information of a plurality of lock objects of a plurality of threads 120. The constructor function RWlockRT::RWlockRT( ) of RWlockRT as shown below may be regarded as an example implementation of block 310 in method 300.

For example, the constructor function RWlockRT::RWlockRT( ) of RWlockRT may be as follows:

```
RWlockRT::RWlockRT( ) {
    ...
    //Acquire a static address of a caller
    void * caller[TRS_CALLER_FETCH_LEVEL];
    TRSGetcallerFetch(caller, TRS_CALLER_FETCH_LEVEL);
    //Save runtime addresses and caller information of locks
    saveInfo2Bin(this, caller);
}
```

As shown above, the statement saveInfo2Bin(this, caller) in the constructor function RWlockRT::RWlockRT( ) can save the runtime address (this) of the lock constructed by the constructor function RWlockRT::RWlockRT( ) this time and save the information of the caller of the constructor function RWlockRT::RWlockRT( ). It should be understood that every time an object of lock A 114 or lock B 118 is created, the constructor function RWlockRT::RWlockRT( ) needs to be called. Therefore, the information of the caller of the constructor function RWlockRT::RWlockRT( ) corresponds to lock A 114 or lock B 118.

In some embodiments, the information of the caller of the constructor function RWlockRT::RWlockRT( ) corresponds to a jump address of the constructor function of lock A 114 or lock B 118 (i.e., the constructor function test::test( ) of the class test corresponds to lock A 114 or lock B 118). It should be understood that in other embodiments, other appropriate constructor functions or other separate functions may also be used to acquire respective runtime addresses and call information of the plurality of lock objects in a plurality of threads 120.

In some embodiments, the constructor function of class 105 can be disassembled to obtain the jump addresses corresponding to lock A 114 and lock B 118 in the constructor function. FIG. 6 shows a schematic diagram of result 601 of disassembling a constructor function (for example, test::test( )) of class 105 (for example, class test) including a lock according to some embodiments of the present disclosure.

As shown in FIG. 6, the call information corresponding to lock A 114 is represented at 605, which may be an example of the first call information at block 320 in method 300 of FIG. 3. 0x00007fde89bf2d56<+20> indicates jump address information corresponding to lock A 114, and <+20> indicates that an offset of the jump address of lock A 114 relative to class 105 is +20. 0x7fde88e1b482<RWlockRT::RWlockRT( )> indicates that at the jump address 0x00007fde89bf2d56<+20>, the program will jump to the address 0x7fde88e1b482 to execute the constructor function RWlockRT::RWlockRT( ) of RWlockRT to initialize the object of lock A 114.

Similarly, the call information corresponding to lock B 118 is indicated at 610, which may be an example of the second call information at block 320 in method 300 of FIG. 3. 0x00007fde89bf2d68<+38> indicates jump address information corresponding to lock B 118, and <+38> indicates that the offset of the jump address of lock B 118 relative to class 105 is +38. 0x7fde88e1b482<RWlockRT::RWlockRT( )> indicates that at the jump address 0x00007fde89bf2d68<+38>, the program will jump to the address 0x7fde88e1b482 to execute the constructor function RWlockRT::RWlockRT( ) of RWlockRT to initialize the object of lock B 118.

It should be understood that a compiler can ensure that offsets of jump addresses for different locks in class 105 are specified. For example, for lock A 114, the jump address offset +20 is specified, and for lock B 118, the jump address offset +38 is specified. In addition, which of the offsets of lock A 114 and lock B 118 is smaller or larger is consistent with the sequence of lock A 114 and lock B 118 in the code segment. Therefore, by saving the runtime addresses and call information of different lock objects (for example, offsets of jump addresses corresponding to different locks, or jump addresses themselves corresponding to different locks) in the constructor function RWlockRT::RWlockRT( ) as described above, the runtime addresses of different lock objects can be mapped to different call information respectively, thereby grouping the runtime addresses into runtime addresses corresponding to different locks.

Returning to FIG. 5, in runtime information 150, address 504 of lock object XA and address 514 of lock object YA in runtime address 510 of the lock objects are mapped to call information 528 of lock A (i.e., 0x00007fde89bf2d56<+20> as shown in 605 of FIG. 6), and address 508 of lock object XB and address 518 of lock object YB are mapped to call information 524 of lock B (i.e., 0x00007fde89bf2d68<+38> in 610 of FIG. 6). The above description may be an example implementation of block 320 in FIG. 3.

In static code 110, the call information of lock A 114 and the call information of lock B 118 are sorted according to the sequence of lock A 114 and lock B 118 in static code 110. For example, since lock A 114 is located before lock B 118 in static code 110, first call information 534 corresponding to lock A 114 is also located before second call information 538 corresponding to lock B 118.

By arranging call information 528 of lock A and call information 524 of lock B from small to large, they are associated with first call information 534 and second call information 538 arranged from small to large in static code 110. In this way, runtime information 150 and static code 110 are associated via the call information.

As mentioned earlier, if a group of runtime addresses (for example, address 504 of lock object XA and address 514 of lock object YA in FIG. 5) corresponding to the call information with the addresses in static code 110 ranked higher are all located before a group of runtime addresses (for example, address 508 of lock object XB and address 518 of lock object YB in FIG. 5) corresponding to the call information with the addresses in static code 110 ranked lower, it means that no deadlock is found.

In contrast, if in a group of runtime addresses (for example, address 504 of lock object XA and address 514 of lock object YA in FIG. 5) corresponding to the call information with the addresses in static code 110 ranked higher, exists a runtime address located after a group of runtime addresses (for example, address 508 of lock object XB and address 518 of lock object YB in FIG. 5) corresponding to the call information with the addresses in static code 110 ranked lower, it means that a deadlock exists.

In this way, since the runtime information is associated with static code 110, the potential deadlock in static code 110 can be analyzed by analyzing the runtime information. In addition, because the runtime information can be automatically analyzed to obtain the potential deadlock, the programmer does not need to manually check the code sentence by sentence, thereby reducing the programmer's work. In addition, compared with the programmer checking the code to look for the deadlock, this method can find the deadlock more quickly and accurately.

It should be understood that although only three threads 120 are shown in FIG. 1 herein, this is only schematic. In practical applications, in a testing phase before official release of a product, by running as many threads as possible or running a combination of more types of different threads, more potential deadlocks can be found as complete as possible. In this way, it is possible to avoid usage errors that customers encounter when using the product after the product is officially released, thereby improving customer satisfaction with the product.

The thread management method described in this article is applicable to threads compiled using various programming languages, including but not limited to object-oriented programming languages (such as C++, JAVA, Python, etc.) and conventional procedural programming languages (such as "C" language or similar programming languages). The thread management method described herein is applicable to a variety of different programming languages, so it is highly versatile. In addition, the method described herein is a cornerstone for designing a lock sequence analysis program. It provides a correlation between "runtime data" and "code-level meaning," so that finding problems in static codes by analyzing runtime data becomes possible.

Figure 7:
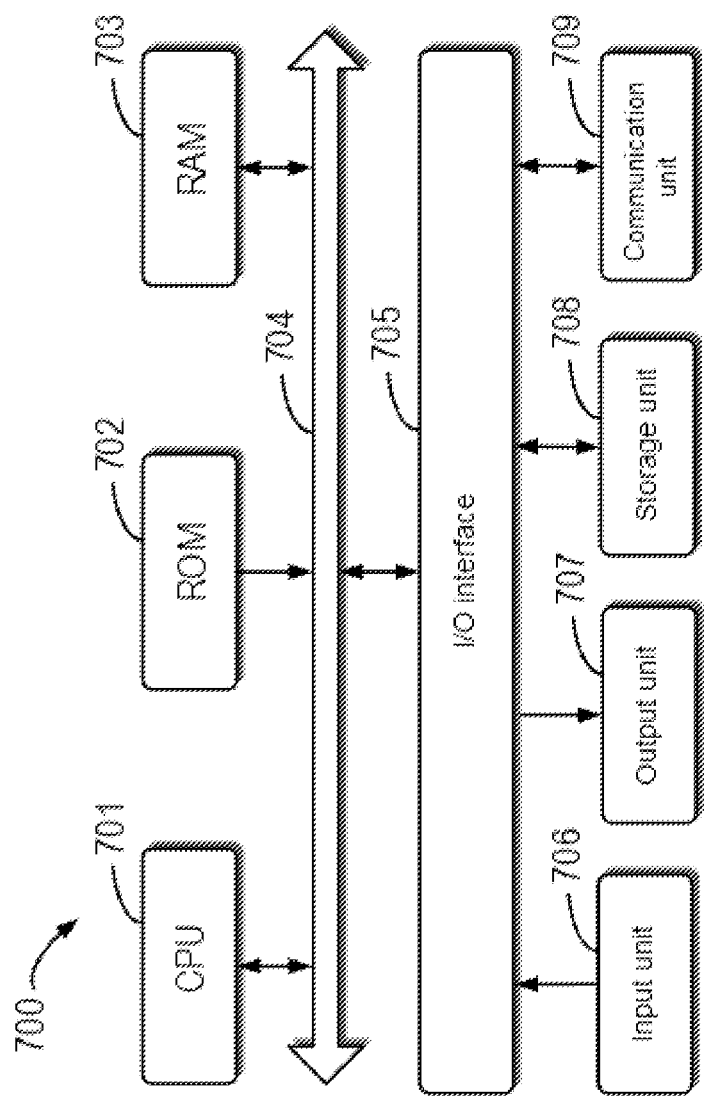
FIG. 7 shows a schematic block diagram of an example device that can be used to implement an embodiment of the present disclosure.

FIG. 7 shows a schematic block diagram of example device 700 that can be configured to implement an embodiment of the present disclosure. For example, storage system 100 as shown in FIG. 1 may be implemented by device 700. As shown in FIG. 7, device 700 includes central processing unit (CPU) 701 that may perform various appropriate actions and processing according to computer program instructions stored in read-only memory (ROM) 702 or computer program instructions loaded from storage unit 708 to random access memory (RAM) 703. In RAM 703, various programs and data required for the operation of device 700 may also be stored. CPU 701, ROM 702, and RAM 703 are connected to each other through bus 704. Input/output (I/O) interface 705 is also connected to bus 704.

Multiple components in device 700 are connected to I/O interface 705, including: input unit 706, such as a keyboard and a mouse; output unit 707, such as various types of displays and speakers; storage unit 708, such as a magnetic disk and an optical disk; and communication unit 709, such as a network card, a modem, and a wireless communication transceiver. Communication unit 709 allows device 700 to exchange information/data with other devices via a computer network such as the Internet and/or various telecommunication networks.

The various processes and processing described above, such as method 300 and/or method 400, may be performed by processing unit 701. For example, in some embodiments, methods 300 and/or 400 may be implemented as a computer software program that is tangibly included in a machine-readable medium such as storage unit 708. In some embodiments, part or all of the computer program may be loaded and/or installed on device 700 via ROM 702 and/or communication unit 709. When the computer program is loaded into RAM 703 and executed by CPU 701, one or more actions of methods 300 and/or 400 described above can be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signals transmitted via electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Smalltalk and C++, and conventional procedural programming languages, such as the C language or similar programming languages. The computer-readable program instructions may be executed entirely on a user's computer, partly on a user's computer, as a stand-alone software package, partly on a user's computer and partly on a remote computer, or entirely on a remote computer or server. In the case where a remote computer is involved, the remote computer can be connected to a user computer over any kind of networks, including a local area network (LAN) or a wide area network (WAN), or can be connected to an external computer (e.g., connected over the Internet using an Internet service provider). In some embodiments, an electronic circuit, for example, a programmable logic circuit, a field programmable gate array (FPGA), or a programmable logic array (PLA), is personalized by utilizing state information of the computer-readable program instructions, wherein the electronic circuit may execute computer-readable program instructions so as to implement various aspects of the present disclosure.

Various aspects of the present disclosure are described herein with reference to flowcharts and/or block diagrams of the method, the apparatus (system), and the computer program product according to the embodiments of the present disclosure. It should be understood that each block in the flowcharts and/or block diagrams as well as a combination of blocks in the flowcharts and/or block diagrams may be implemented using computer-readable program instructions.

The computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented by using a special hardware-based system for executing specified functions or actions or by a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or the improvements to technologies on the market, or to enable other persons of ordinary skill in the art to understand the embodiments disclosed herein.

The invention claimed is:

1. A method for managing threads, comprising:
   acquiring respective runtime addresses and call information of a plurality of lock objects in a plurality of threads;
   determining, from the plurality of lock objects, a first group of lock objects associated with first call information and a second group of lock objects associated with second call information different from the first call information; and
   providing an indication that a deadlock exists in the plurality of threads if it is determined that a first group of runtime addresses of the first group of lock objects overlaps with a second group of runtime addresses of the second group of lock objects.

2. The method according to claim 1, wherein providing the indication comprises:
   sorting the first group of lock objects and the second group of lock objects according to the first group of runtime addresses and the second group of runtime addresses; and
   providing the indication if it is determined that a first lock object in the first group of lock objects is ranked lower than a second lock object in the second group of lock objects.

3. The method according to claim 1, wherein the first group of lock objects corresponds to a first lock in a static code, and the second group of lock objects corresponds to a second lock in the static code and different from the first lock.

4. The method according to claim 3, wherein a first static address of the first lock in a code segment is located before a second static address of the second lock in the code segment.

5. The method according to claim 3, wherein the indication comprises a name of the first lock and a name of the second lock.

6. The method according to claim 3, wherein the first call information comprises a first jump address corresponding to the first lock, and the second call information comprises a second jump address corresponding to the second lock.

7. The method according to claim 6, further comprising:
   disassembling constructor functions of the first lock and the second lock to determine the first jump address and the second jump address.

8. An electronic device, comprising:
   at least one processor; and
   at least one memory storing computer program instructions, the at least one memory and the computer program instructions being configured to cause, together with the at least one processor, the electronic device to perform actions comprising:
   acquiring respective runtime addresses and call information of a plurality of lock objects in a plurality of threads;
   determining, from the plurality of lock objects, a first group of lock objects associated with first call information and a second group of lock objects associated with second call information different from the first call information; and
   providing an indication that a deadlock exists in the plurality of threads if it is determined that a first group of runtime addresses of the first group of lock objects overlaps with a second group of runtime addresses of the second group of lock objects.

9. The electronic device according to claim 8, wherein providing the indication comprises:

sorting the first group of lock objects and the second group of lock objects according to the first group of runtime addresses and the second group of runtime addresses; and providing the indication if it is determined that a first lock object in the first group of lock objects is ranked lower than a second lock object in the second group of lock objects.

10. The electronic device according to claim 8, wherein the first group of lock objects corresponds to a first lock in a static code, and the second group of lock objects corresponds to a second lock in the static code and different from the first lock.

11. The electronic device according to claim 10, wherein a first static address of the first lock in a code segment is located before a second static address of the second lock in the code segment.

12. The electronic device according to claim 10, wherein the indication comprises a name of the first lock and a name of the second lock.

13. The electronic device according to claim 10, wherein the first call information comprises a first jump address corresponding to the first lock, and the second call information comprises a second jump address corresponding to the second lock.

14. The electronic device according to claim 13, wherein the actions further comprise:

disassembling constructor functions of the first lock and the second lock to determine the first jump address and the second jump address.

15. A computer program product having a non-transitory computer readable medium which stores a set of instructions to manage threads; the set of instructions, when carried out by computerized circuitry, causing the computerized circuitry to perform a method of:

acquiring respective runtime addresses and call information of a plurality of lock objects in a plurality of threads;

determining, from the plurality of lock objects, a first group of lock objects associated with first call information and a second group of lock objects associated with second call information different from the first call information; and providing an indication that a deadlock exists in the plurality of threads if it is determined that a first group of runtime addresses of the first group of lock objects overlaps with a second group of runtime addresses of the second group of lock objects.

* * * * *